United States Patent
Ostrow et al.

(10) Patent No.: US 10,093,405 B2
(45) Date of Patent: Oct. 9, 2018

(54) SHIP EMERGENCY STOPPING

(71) Applicant: ABB Schweiz AG, Baden (CH)

(72) Inventors: Niko Ostrow, Helsinki (FI); Risto Gylden, Helsinki (FI)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 15/661,842

(22) Filed: Jul. 27, 2017

(65) Prior Publication Data

US 2017/0320555 A1 Nov. 9, 2017

Related U.S. Application Data

(63) Continuation of application No. PCT/EP2016/051419, filed on Jan. 25, 2016.

(30) Foreign Application Priority Data

Jan. 27, 2015 (EP) .................................... 15152584

(51) Int. Cl.
*B63H 25/50* (2006.01)
*G05D 1/02* (2006.01)
*B63H 5/125* (2006.01)

(52) U.S. Cl.
CPC ............ *B63H 25/50* (2013.01); *B63H 5/125* (2013.01); *G05D 1/0206* (2013.01); *B63H 2005/1254* (2013.01)

(58) Field of Classification Search
CPC .................... B63H 25/50; B63H 5/125; B63H 2005/1254; G05D 1/0206
See application file for complete search history.

(56) References Cited

U.S. PATENT DOCUMENTS

| 6,592,412 B1 * | 7/2003 | Geil ........................ B63B 1/042 114/144 E |
| 2006/0246793 A1 * | 11/2006 | Korhonen ................ B63H 5/08 440/79 |
| 2017/0081010 A1 * | 3/2017 | Kuribayashi ........ B63H 25/383 |

FOREIGN PATENT DOCUMENTS

| JP | 2012116248 A | 6/2012 |
| WO | 0100485 A1 | 1/2001 |
| WO | 2004089740 A1 | 10/2004 |
| WO | 2013119175 A | 8/2013 |

OTHER PUBLICATIONS

International Search Report and Written Opinion, PCT/EP2016/051419, ABB Oy, dated Apr. 1, 2016, 10 pages.

* cited by examiner

*Primary Examiner* — Mary Cheung
(74) *Attorney, Agent, or Firm* — J. Bruce Schelkopf; Taft Stettinius & Hollister LLP

(57) ABSTRACT

The present application relates generally to a control arrangement for controlling at least two azimuthing propulsion units of a ship. The control arrangement comprises a crash stop activation member for activating a crash stop procedure, after which the crash stop procedure is executed in which the orientation and propulsion speed of the azimuthing propulsion units are controlled until the propagation speed of the ship has at least been reduced from the moment when the crash stop procedure was activated.

19 Claims, 1 Drawing Sheet

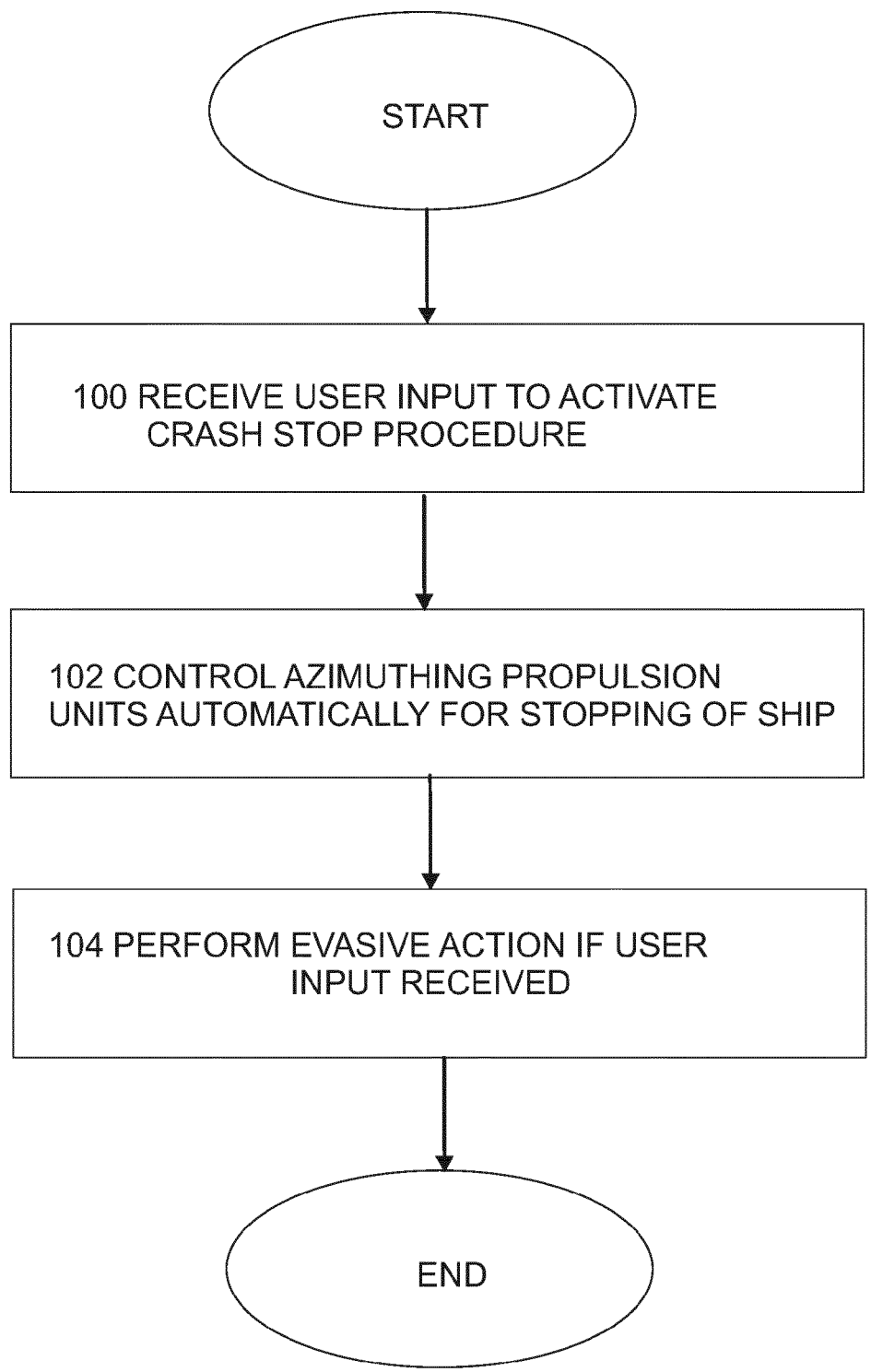

SHIP EMERGENCY STOPPING

FIELD

The present invention relates to crash or emergency stopping of a ship provided with azimuthing propulsion unit(s).

BACKGROUND

An azimuthing propulsion unit is a configuration of marine propellers that can be rotated horizontally to any angle. This gives the ship better maneuverability than a fixed propeller and rudder system.

Typically a ship has two azimuthing propulsion units adjacent to each other. Each azimuthing propulsion unit may have a manual controller for controlling the propulsion unit.

In an emergency stopping situation, plurality of factors needs to be taken into account, such as the stopping distance, the stopping direction and safety of the stopping procedure for the ship equipment and the persons therein.

In a conventional emergency stopping procedure the propeller unit's orientation are maintained in the cruising position, that is, the propeller is pointing substantially towards the transom of the ship. The rotation direction of the propellers is, however, reversed. As the propellers are optimised for a pushing mode, the pulling mode of the reverse operation fails to stop the ship at an optimal distance.

A more efficient way of stopping the ship is a so called podway crash stop procedure, in which the propulsion units are rotated such that the propellers point at least substantially towards the head of the ship. Thereby the efficient pushing mode of the propellers may be utilized in stopping the ship.

However, the emergency stopping procedure is often carried out under high pressure and in confined space, it is very difficult and requires a lot of training and experience. Lacking such experience and confidence, the controller of the ship may be tempted to apply the conventional emergency stopping procedure and avoid using the more efficient but risky podway crash stop procedure.

An improved emergency stopping equipment and method is thus called for.

SUMMARY

An object of the present invention is to provide a control arrangement and a method which are defined in the independent claims. Some embodiments are disclosed in the dependent claims.

DRAWINGS

In the following, the invention will be described in greater detail by means of some embodiments with reference to the accompanying drawing, in which FIG. 1 shows an embodiment of a method of performing a crash stop of a ship.

DETAILED DESCRIPTION

The embodiments relate to a ship, and especially to an emergency/crash stop procedure and an apparatus for carrying out such emergency stop of the ship.

The ship according to the embodiments comprises at least two azimuthing propulsion units. The azimuthing propulsion unit is arranged to a bottom of the ship and can be horizontally rotated as desired. There may be arranged a space to the bottom of the ship such that the azimuthing propulsion units fit within the outer dimensions of the ship even when rotated to any position. The azimuthing propulsion units may be arranged symmetrically adjacent to each other behind the skeg of the ship.

The azimuthing propulsion unit comprises a pod, which is fixedly arranged to a strut. The strut is arranged rotationally by a bearing/swivel unit to the bottom of the ship. The pod houses an electric propulsion motor for rotating a propeller fixed to a hub at the end of the pod. A shaft rotated by the electric motor is the same shaft that rotates the propeller or at least coaxial to it.

One principal operation mode of the azimuthing propulsion unit is a cruising mode, in which the propellers point towards the rear of the ship and are in a pushing mode. In an emergency situation, the propulsion units may be rotated from the cruising mode while maintaining the pushing operation mode.

The azimuthing propulsion units may be controlled from a control bridge of the ship. There may be provided a control lever for each propulsion unit. By using the control lever, the operator/captain of the ship may control the orientation and/or propulsion power (revolution speed) of the azimuthing propulsion unit. There may also be provided a wheel or a miniwheel for controlling the azimuthing propulsion units jointly with one lever.

Due to the extreme complexity of operating the propulsion units manually during the emergency stop procedure, an automatized emergency stop procedure is provided. This automatized procedure may be initiated by a push button or a lever on the control panel/bridge of the ship, for instance. The automatized emergency stop procedure may have one or more stages, in which the orientation and/or the rotation speed of the propulsion unit(s) may be controlled. In a basic mode, the two propulsion units are controlled symmetrically such that the ship stays on a straight course.

In an embodiment, the crash stop procedure comprises a plurality of stages. In a first stage, the orientation of the propulsion units may be maintained, but the rotation speed of the propellers is decreased. This phase may be applied until the speed of the ship has decreased under a predetermined threshold value.

Then, after the first phase, the propulsion units may be rotated at least 90 degrees but less than 180 degrees to reduce the speed of the ship below a second threshold value. In an embodiment the orientation of the propellers is about 135 degrees from the initial position where the propellers point towards the transom of the ship.

When the speed of the ship has reduced under the second threshold, the turning of the azimuthing propulsion units to an angle that is substantially 180 degrees from the initial position may be completed. This mode is applied until the speed of the ship has declined under a third threshold value.

Finally, the propulsion units may be rotated about 90 degrees so that the propellers of the propulsion units point to each other. This stage may be applied to balance the ship.

In the embodiments, the manual control device(s) may at least in some extent override the automatized crash stop procedure. The manual control device may, for instance, slow down rotation of one of the propulsion units, which rotation is determined by the crash stop procedure. In this way the breaking effect of the propulsion unit slowed down may be decreased whereby the ship turns towards the other side. Alternatively or additionally, the manual control device(s) may be applied to adjust the orientation of one or both propulsion units.

The dependency between the miniwheel and the propulsion units may be such, for instance, that when the controller rotates the miniwheel to the right indicating that the ship should turn to the right, the control system decreases the breaking power of the propulsion unit on the right.

In the crash stop mode, both azimuthing propulsion units are rotated at least 90 degrees from the initial cruising mode position where both propulsion units are pointing towards the rear of the ship. When the crash stop mode has been initiated, the azimuthing propulsion units are preferably operated symmetrically to each other. That is, they are both operated in the same angle with respect to the ship hull, and their propulsion powers are equal to each other. In this way, the ship propagates straight ahead during the crash stop mode.

FIG. 1 shows an embodiment of a method. In 100, the user provides an input to initiate the crash stop procedure. The input can be given on the control bridge by a push button, for instance. Alternatively, there may be provided a lever for activating the procedure. In some embodiments, the same button or lever may be used to deactivate the procedure if desired.

In 102, the azimuthing propulsion units may be controlled to perform the crash stop procedure. As explained above, the procedure may include several stages where the control parameters of the propulsion units such as orientation and propulsion power are adjusted according to predefined or calculated threshold settings. The crash stop procedure may be implemented by means of software and/or hardware. The control procedure may cause control devices provided on the bridge board to physically react on the stages of the control procedure. That is, the control levers, such as azimuthing levers, miniwheel or a wheel may be physically rotated or the speed control may be adjusted according to the procedure.

In 104, the control devices/levers may be operated although the crash stop procedure is ongoing. That is, the user may adjust the course of the ship, for instance by rotating an azimuthing lever or miniwheel to perform an evasive action of the ship. When the user has finished performing the evasive action, the procedure may again take over and continue to stop the ship as soon as possible on a straight propagation path.

The embodiments provide several advantages. The basic mode where the crash stop procedure is automatized, provides a very good basis for basis for an efficient and stabile stopping procedure of the ship. When the propeller units are controlled concurrently, simultaneously and symmetrically, the risk of tilting of the ship can be avoided. Furthermore, when the orientations of the propeller units are based on the speed of the ship, breaking of the ship component due to too rapid control movements can be avoided.

When the basic crash stop procedure is automatized for the main part, the captain of the ship may concentrate on evaluating if evasive actions are needed to carry out the crash stop procedure optimally. When the captain carries out evasive actions on a manual controller or a voice controller, for instance, the control actions may override the basic emergency stop procedure at least partly. All the time the crash stop procedure may set limits in which the evasive actions can be taken to maintain the safety of the crash stop procedure.

It will be obvious to a person skilled in the art that, as the technology advances, the inventive concept can be implemented in various ways. The invention and its embodiments are not limited to the examples described above but may vary within the scope of the claims.

The invention claimed is:

1. A control arrangement for controlling at least two azimuthing propulsion units of a ship, comprising:
one or more levers for controlling the at least two azimuthing propulsion units separately or jointly;
a crash stop activation member for activating a crash stop procedure; means for performing the crash stop procedure in which the orientation and propulsion speed of the azimuthing propulsion units are controlled until the propagation speed of the ship has at least been reduced from the moment when the crash stop procedure was activated by the crash stop activation member, wherein the control arrangement is configured to adjust the crash stop procedure, by adjusting orientation and/or propulsion power of at least one azimuthing propulsion unit according to an operator control gesture received on the one or more levers during the crash stop procedure.

2. The control arrangement according to claim 1, wherein the control arrangement comprises a control bridge of the ship.

3. The control arrangement according to claim 2, wherein the activation member comprises a push button provided on the control bridge of the ship.

4. The control arrangement according to claim 2, wherein the control arrangement is configured to physically perform control gestures decided by the crash stop procedure on the one or more levers.

5. The control arrangement according to claim 2, wherein the crash stop procedure comprises a stage where the azimuthing propulsion units are operated in a pushing mode and rotated at least 90 degrees from a position where a propeller of the azimuthing propulsion unit points towards a transom of the ship.

6. The control arrangement according to claim 2, wherein the crash stop procedure is arranged to control the at least two azimuthing propulsion units symmetrically such that propulsion powers of the azimuthing propulsion units are equal to each other and the orientations are symmetric about longitudinal direction of the ship.

7. The control arrangement according to claim 1, wherein the activation member comprises a push button provided on the control bridge of the ship.

8. The control arrangement according to claim 7, wherein the control arrangement is configured to physically perform control gestures decided by the crash stop procedure on the one or more levers.

9. The control arrangement according to claim 7, wherein the crash stop procedure comprises a stage where the azimuthing propulsion units are operated in a pushing mode and rotated at least 90 degrees from a position where a propeller of the azimuthing propulsion unit points towards a transom of the ship.

10. The control arrangement according to claim 1, wherein the control arrangement is configured to physically perform control gestures decided by the crash stop procedure on the one or more levers.

11. The control arrangement according to claim 10, wherein the crash stop procedure comprises a stage where the azimuthing propulsion units are operated in a pushing mode and rotated at least 90 degrees from a position where a propeller of the azimuthing propulsion unit points towards a transom of the ship.

12. The control arrangement according to claim 1, wherein the crash stop procedure comprises one or more stages so that the orientation and/or propulsion power of the azimuthing propulsion units is varied between the stages.

13. The control arrangement according to claim 12, wherein the crash stop procedure comprises a stage where the azimuthing propulsion units are operated in a pushing mode and rotated at least 90 degrees from a position where a propeller of the azimuthing propulsion unit points towards a transom of the ship.

14. The control arrangement according to claim 1, wherein the crash stop procedure comprises a stage where the azimuthing propulsion units are operated in a pushing mode and rotated at least 90 degrees from a position where a propeller of the azimuthing propulsion unit points towards a transom of the ship.

15. The control arrangement according to claim 1, wherein the crash stop procedure is arranged to control the at least two azimuthing propulsion units symmetrically such that propulsion powers of the azimuthing propulsion units are equal to each other and the orientations are symmetric about longitudinal direction of the ship.

16. The control arrangement according to claim 1, wherein the crash stop procedure is configured to change orientation of the azimuthing propulsion units as a function of a speed of the ship.

17. The control arrangement according to claim 1, wherein the crash stop procedure comprises one or more of the following stages:
 a first stage arranged to turn the at least two azimuthing propulsion units less than 180 degrees from a cruising position where a propeller of the azimuthing propulsion unit points towards a transom of the ship, and applying a maximal propulsion power until a speed of the ship declines below a first threshold value;
 a second stage for completing the turning of the azimuthing propulsion units to an angle that is substantially 180 degrees from the cruising position, and applying a maximal propulsion power until the speed of the ship declines under a second threshold value; and
 a third stage for rotating the azimuthing propulsion units to a position being 90 degrees from the initial position for balancing of the ship.

18. A method of performing an emergency stop of a ship having at least two azimuthing propulsion units, the method comprising:
 receiving an input from an operator of the ship that a crash stop procedure is to be started; and
 performing a crash stop procedure to automatically control the at least two azimuthing propulsion units for stopping of the ship, said performing comprising:
 receiving a control input via a manual controller for controlling a course of the ship during the crash stop procedure; and
 adjusting the crash stop procedure such that at least one of the orientation and the propagation power of at least one azimuthing propulsion unit diverges from the respective values determined by the crash stop procedure.

19. The method according to claim 18, wherein the crash stop procedure comprises one or more stages in which the orientation of the azimuthing propulsion units is varied as a function of the speed of the ship.

\* \* \* \* \*